(12) United States Patent
Miller et al.

(10) Patent No.: US 9,857,585 B2
(45) Date of Patent: Jan. 2, 2018

(54) ROLLING BEAM SPLITTER OPTICAL SWITCHING MECHANISM FOR COMBINATION AND SELECTION OF DETECTOR ILLUMINATION

(71) Applicant: RAYTHEON COMPANY, Waltham, MA (US)

(72) Inventors: Kirk A. Miller, Dallas, TX (US); Douglas J. Hartnett, The Colony, TX (US)

(73) Assignee: RAYTHEON COMPANY, Waltham, MA (US)

( * ) Notice: Subject to any disclaimer, the term of this patent is extended or adjusted under 35 U.S.C. 154(b) by 42 days.

(21) Appl. No.: 14/976,009

(22) Filed: Dec. 21, 2015

(65) Prior Publication Data
US 2017/0176739 A1    Jun. 22, 2017

(51) Int. Cl.
| G02B 26/08 | (2006.01) |
| G02B 27/12 | (2006.01) |
| G02B 27/14 | (2006.01) |
| G02B 27/10 | (2006.01) |

(52) U.S. Cl.
CPC ..... *G02B 26/0816* (2013.01); *G02B 27/1073* (2013.01); *G02B 27/149* (2013.01)

(58) Field of Classification Search
CPC .......................... G02B 26/0816; G02B 27/149
USPC .................................. 359/211.1, 211.2, 221.2
See application file for complete search history.

(56) References Cited

U.S. PATENT DOCUMENTS

| 4,697,882 A * | 10/1987 | Sato ...................... G02B 7/1805 |
| | | 359/211.1 |
| 4,889,418 A * | 12/1989 | Benjamin ................ G02B 5/09 |
| | | 359/217.1 |
| 5,226,614 A | 7/1993 | Carlson |
| 5,485,306 A | 1/1996 | Kiunke et al. |
| 6,360,037 B1 * | 3/2002 | Riza ....................... G02B 6/272 |
| | | 385/22 |
| 6,396,042 B1 * | 5/2002 | Boardman ........... G11B 7/0025 |
| | | 250/201.5 |
| 6,486,997 B1 * | 11/2002 | Bruzzone .............. B29C 55/023 |
| | | 349/9 |
| 7,221,505 B2 | 5/2007 | Goral |
| 7,640,691 B2 * | 1/2010 | Karcher .................... F41G 1/40 |
| | | 359/399 |

(Continued)

FOREIGN PATENT DOCUMENTS

WO    2005096071 A2    10/2005

OTHER PUBLICATIONS

International Search Report and Written Opinion of the International Searching Authority for application No. PCT/US2016/037351 dated Oct. 10, 2016.

*Primary Examiner* — Frank Font
(74) *Attorney, Agent, or Firm* — Lando & Anastasi, LLP (57) ABSTRACT

A rolling beam splitter optical switching mechanism for combination and selection of detector illumination includes a housing and an immersed cube beam splitter supported by the housing. The beam splitter is configured to direct electromagnetic radiation in a first direction and a second direction. The switching mechanism further includes a drive assembly configured to rotate the housing and the beam splitter to change a direction of electromagnetic radiation directed by the beam splitter in the second direction.

17 Claims, 7 Drawing Sheets

(56) References Cited

U.S. PATENT DOCUMENTS

| | | | | |
|---|---|---|---|---|
| 7,796,340 B2* | 9/2010 | Bloch | ............... | G02B 27/0905 359/211.2 |
| 9,678,331 B1* | 6/2017 | Miller | ............... | G02B 26/0816 |
| 9,696,495 B2* | 7/2017 | Mei | ............... | G02B 6/2706 |
| 9,696,499 B2* | 7/2017 | Wilhelm | ............... | G02B 6/3518 |
| 2004/0170207 A1* | 9/2004 | Reilly | ............... | G02B 7/003 372/92 |
| 2006/0091338 A1 | 5/2006 | Koren | | |
| 2010/0002196 A1* | 1/2010 | Lu | ............... | G02B 27/1053 353/31 |
| 2010/0265587 A1* | 10/2010 | Hotteling | ............... | G02B 5/04 359/618 |
| 2016/0025929 A1* | 1/2016 | Mei | ............... | G02B 6/2773 359/230 |

* cited by examiner

ROLLING BEAM SPLITTER OPTICAL SWITCHING MECHANISM FOR COMBINATION AND SELECTION OF DETECTOR ILLUMINATION

BACKGROUND

Modern tactical aircraft use a number of imaging aids to assist the crew in viewing a scene, selecting targets in the scene, and directing weapons against the selected targets. Visible, infrared, and/or specific spectral bands imaging devices are used in various applications to form an image of the scene. The type imaging spectrum depends upon the mission, weather conditions, the nature of the scene, as well as other factors.

The field of view of an imaging device, used to form the image of the scene, describes the range of the captured scene. A wide field of view allows the imaging device to capture a large area of the scene. In turn, a smaller field of view captures less of the scene, allowing the image device to "focus in" on the image, and may further help to discern small features within the image.

Multi-spectral targeting systems may use both infrared and visible light imaging sensors and may include multiple different optical systems suited for use with each type of sensor. For example, optical system used with an infrared image sensor may not be suitable for use with a visible light image sensor. Additional optical systems may be included in the multi-spectral targeting systems for capturing images with different fields of view. There is a need to enable several detectors to share a common aperture in combinations of two or more detectors. Presently, a stationary prism assembly divides light into up to three directions for the illumination of detectors. However, presently available switching mirrors allow light to pass to only one of three possible detectors.

SUMMARY OF INVENTION

One aspect of the present disclosure is directed to a rolling beam splitter optical switching mechanism for combination and selection of detector illumination. In one embodiment, the switching mechanism comprises a housing and an immersed cube beam splitter supported by the housing. The beam splitter is configured to direct electromagnetic radiation in a first direction and a second direction. The switching mechanism further comprises a drive assembly configured to rotate the housing and the beam splitter to change a direction of electromagnetic radiation directed by the beam splitter in the second direction.

Embodiments of the switching mechanism further may include the first direction of electromagnetic radiation directed by the beam splitter extending in a direction parallel to an axial direction of the housing. The second direction of electromagnetic radiation direction by the beam splitter may extend in a direction perpendicular to the first direction. The drive assembly may include a drive gear secured to the housing and a driven gear, coupled to a motor, configured to drive the drive gear. The drive gear and the driven gear may be spur gears. The drive assembly further may include at least one adjustable hard stop to limit the rotation of the housing.

Another aspect of the disclosure is directed to a rolling beam splitter optical switching mechanism comprising a housing and an immersed cube beam splitter supported by the housing. The beam splitter is configured to direct electromagnetic radiation in a first direction and a second direction. The switching mechanism further comprises means for rotating the housing and the beam splitter to change a direction of electromagnetic radiation directed by the beam splitter in the second direction.

Embodiments of the switching mechanism further may include the first direction of electromagnetic radiation directed by the beam splitter extending in a direction parallel to an axial direction of the housing. The second direction of electromagnetic radiation direction by the beam splitter may extend in a direction perpendicular to the first direction. The means for rotating may include a drive assembly coupled to the beam splitter. The drive assembly may include a drive gear secured to the housing and a driven gear, coupled to a motor, configured to drive the drive gear. The drive gear and the driven gear may be spur gears. The drive assembly further may include at least one adjustable hard stop to limit the rotation of the housing.

Yet another aspect of the disclosure is directed to a method of directing electromagnetic radiation from a beam splitter to a target. In one embodiment, the method comprises: directing electromagnetic radiation to an immersed cube beam splitter supported by a housing, the beam splitter being configured to direct electromagnetic radiation in a first direction and a second direction; and rotating the beam splitter to change a direction of electromagnetic radiation directed by the beam splitter in the second direction.

Embodiments of the method further may include stopping the rotation of the beam splitter with at least one adjustable hard stop to limit the rotation of the beam splitter. The first direction of electromagnetic radiation directed by the beam splitter may extend in a direction parallel to an axial direction of the housing. The second direction of electromagnetic radiation direction by the beam splitter may extend in a direction perpendicular to the first direction. Rotating the beam splitter may include a drive assembly coupled to the beam splitter. The drive may include a drive gear secured to the housing and a driven gear, coupled to a motor, configured to drive the drive gear. The drive gear and the driven gear may be spur gears.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

As discussed above, there is a need to enable several detectors to share a common aperture in combinations of two or more detectors. The rolling beam splitter optical switching mechanism of embodiments of the present disclosure enable a combination of two optical detectors from a selection of three or more detectors. Aspects and embodiments are directed to a rolling beam splitter optical switching mechanism that may be implemented by an immersed cube beam splitter, a plate beam splitter paired with orthogonally tilted window, a wedged plate beam splitter with decentering effect, and a beam splitter driven by direct drive torque, geared motor or harmonic drive. The rolling beam splitter optical switching mechanism enables one detector to have continuous use of a common aperture.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
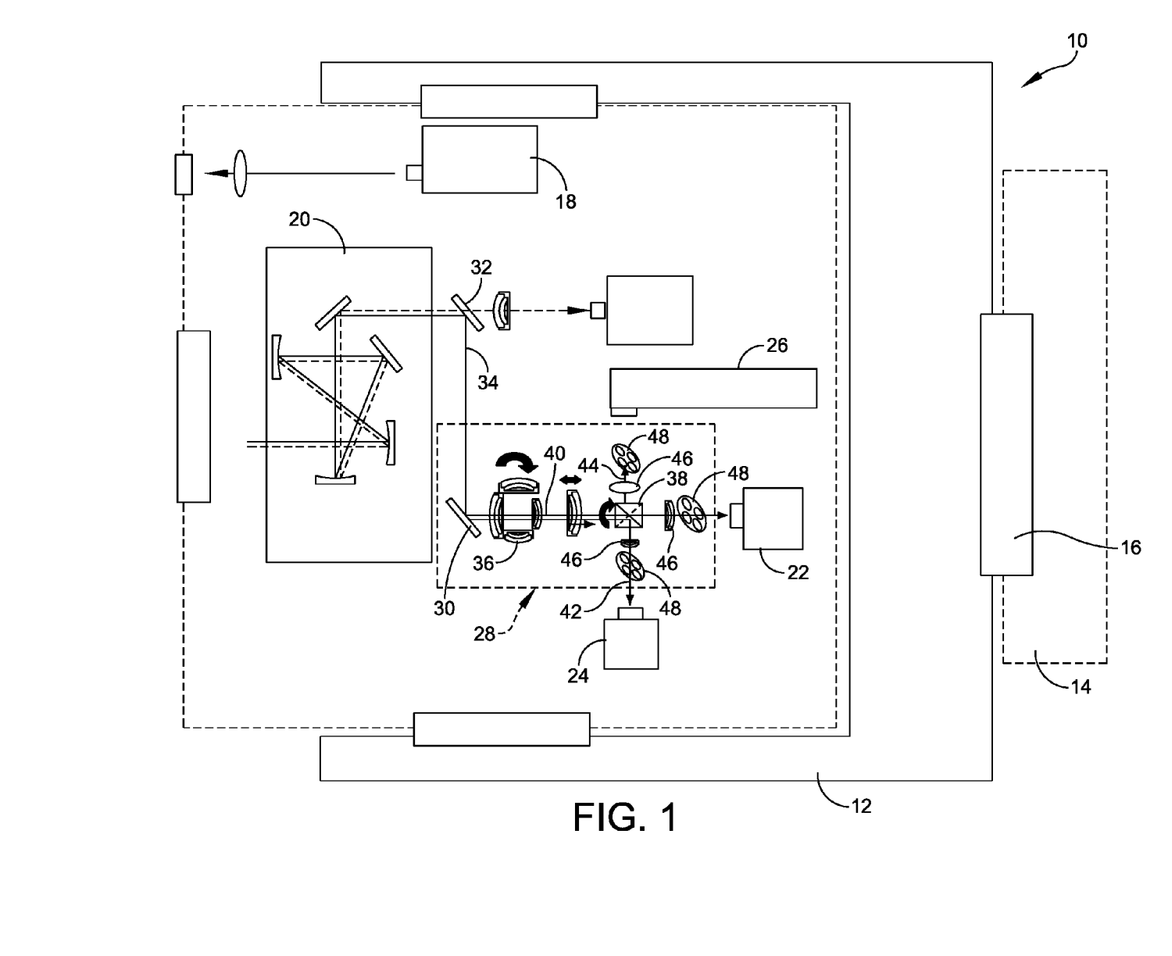
FIG. 1 is a schematic view of a rolling beam splitter optical switching mechanism of an embodiment of the present disclosure.

Referring to FIG. 1, an optical system is generally indicated at 10. As shown, the optical system 10 includes an azimuth platform 12 that is coupled to an azimuth base 14 by a rotary joint 16. The azimuth platform 12 is configured to support components of the optical system 10, including, but not limited to a laser 18, a shared aperture telescope 20, and multiple detectors, including a short-wave infrared (SWIR) camera 22, a visible (VIS) camera 24, and a near infrared (NIR) camera 26. Electromagnetic radiation (e.g., a laser beam) is directed from the shared aperture telescope 20 to the detectors by way of a rolling beam splitter optical switching mechanism, which is generally indicated at 28 in FIG. 1. The switching mechanism 28 is configured to direct electromagnetic radiation from the shared aperture telescope 20 to the SWIR camera 22 and optionally to one of the other detectors, specifically, the VIS camera 24 or the NIR camera 26. Embodiments of the switching mechanism 28 may also be configured to direct electromagnetic radiation to one or two additional detectors.

As shown, the switching mechanism 28 includes several components that are used to direct magnetic radiation through the switching mechanism. Specifically, the switching mechanism 28 includes a mirror 30, which is positioned to receive electromagnetic radiation from a mirror 32 positioned adjacent the shared aperture telescope 20 along an optical path 34. The mirror directs electromagnetic radiation to an effective focal length (EFL) switching optics 36, which in turn directs the electromagnetic radiation to an immersed cube beam splitter 38 of embodiments of the present disclosure along optical path 40. The beam splitter cube 38 is an optical device that is configured to direct a customizable percent of the incident light (the transmitted light) to one device, i.e., the SWIR camera and the remaining fraction of the incident light (the reflected light) to one of the two other detectors, i.e., the VIS camera or the NIR camera, along optical path 42 or optical path 44, respectively. The design of the beam splitter cube 38 depends on the system level requirements. For example, one hundred percent of the SWIR light directed to the SWIR camera is acceptable when none of the other cameras are capable of, or do not have requirements of, sensing that part of the spectrum. Prior to passing to the detectors 22, 24, 26, the electromagnetic radiation passes through a field lens, each indicated at 46 and a filter wheel, each indicated at 48.

Figure 2:
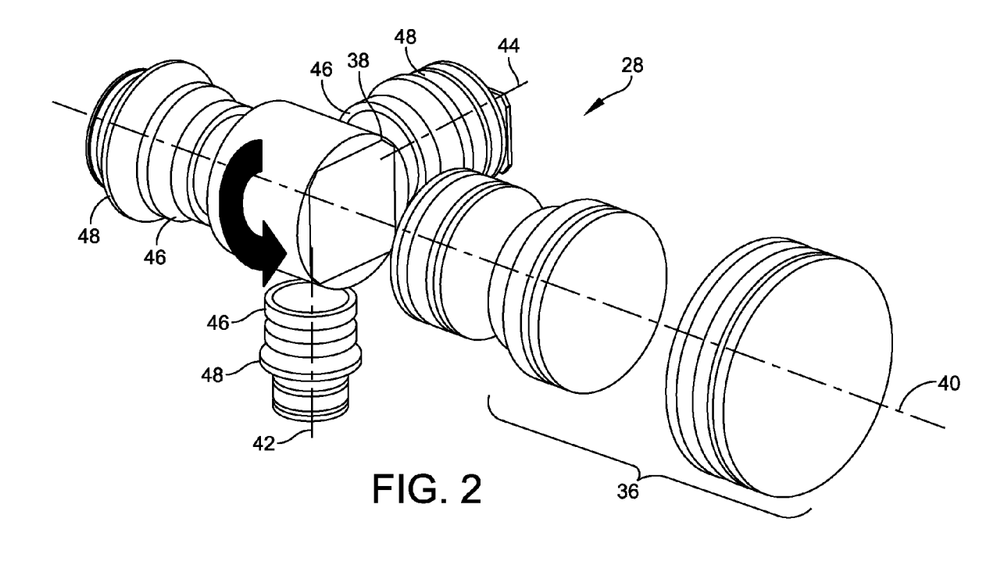
FIG. 2 is a schematic view of the rolling beam splitter optical switching mechanism of FIG. 1 showing electromagnetic radiation travelling through the switching mechanism.
Figure 3:
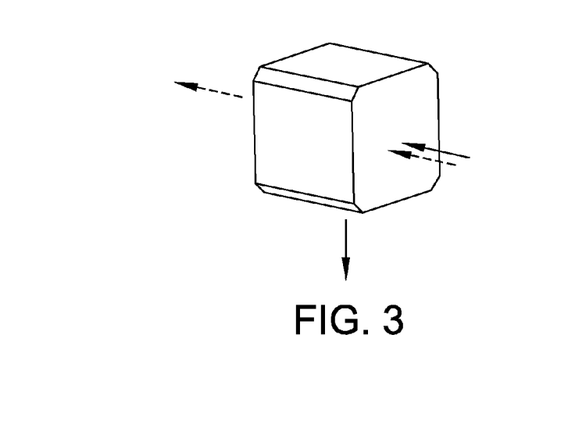
FIG. 3 is a view of the rolling beam splitter optical switching mechanism shown in a position to direct electromagnetic radiation to a detector, such as a color TV.
Figure 4:
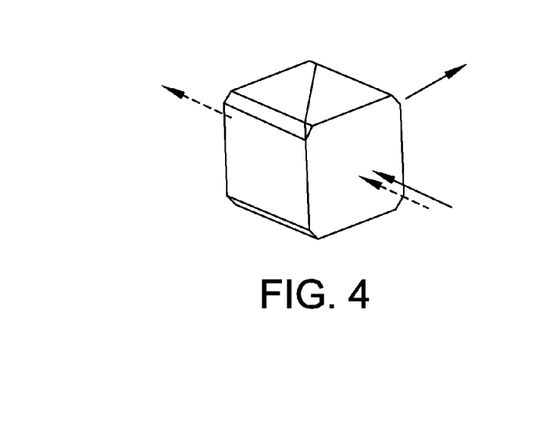
FIG. 4 is a view of the rolling beam splitter optical switching mechanism shown in a position to direct electromagnetic radiation to a detector, such as an electronic chip based camera system.

Referring additionally to FIG. 2, the beam splitter cube 38 is isolated to show electromagnetic radiation traveling from the EFL switching optics 36 through the beam splitter cube to the SWIR camera 22 along optical path 40 and to the VIS camera along optical path 42 or to the NIR camera along optical path 44 via respective field lens 46 and the filter wheels 48. As mentioned above, the beam splitter cube 38 is configured to always direct transmitted electromagnetic radiation to the SWIR camera 22. As will be described in greater detail below, the beam splitter cube 38 is rotatable to direct the reflected electromagnetic radiation to one of the VIS camera 24 or the NIR camera 26. In one embodiment, the beam splitter cube 38 is a 0.75 inch×0.75 inch×0.75 inch cube with edge chamfers to enable greater clearance during rotation of the beam splitter cube. FIG. 3 illustrates the beam splitter cube 38 oriented to deliver the reflected electromagnetic radiation to the VIS camera 24. FIG. 4 illustrates the beam splitter cube 38 oriented to deliver the reflected electromagnetic radiation to the NIR camera 26. The beam splitter cube 38 is sized to rotate within the switching mechanism 28 with a one-quarter turn rotation; however, the beam splitter cube can be configured to rotate one-half or three-quarter turn rotations.

Figure 5:
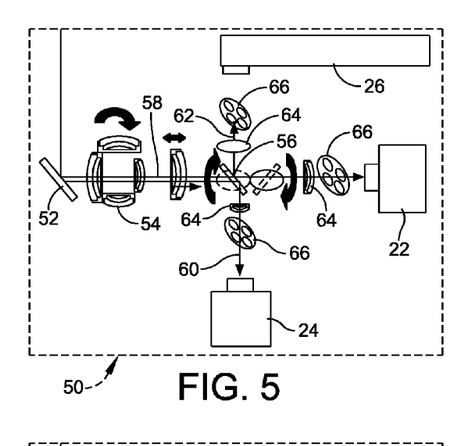
FIG. 5 is a schematic view of a rolling beam splitter optical switching mechanism of another embodiment of the present disclosure.
Figure 6:
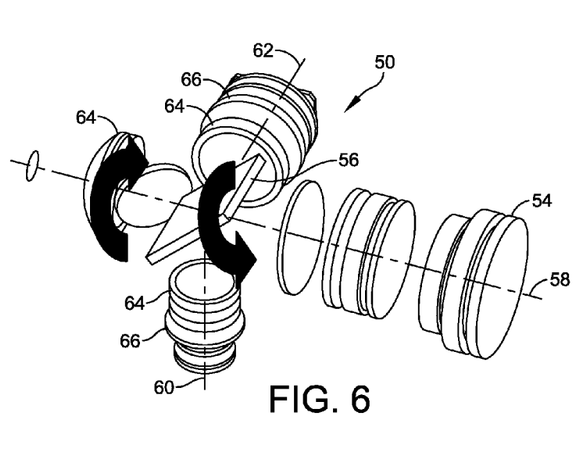
FIG. 6 is a schematic view of the rolling beam splitter optical switching mechanism of FIG. 5 showing electromagnetic radiation travelling through the switching mechanism.

Referring to FIGS. 5 and 6, another rolling beam splitter optical switching mechanism is generally indicated at 50. The rolling beam splitter optical switching mechanism 50 is similarly constructed as switching mechanism 28, and includes a mirror 52, which is positioned to receive electromagnetic radiation from the mirror 32 positioned adjacent the shared aperture telescope 20. The mirror 52 directs electromagnetic radiation to an effective focal length (EFL) switching optics 54, which in turn directs the electromagnetic radiation to a counter rotating plate beam splitter and tilted plate 56 along an optical path 58, which is configured to direct a customizable percent of the incident light to the SWIR camera 22 and the remaining fraction of the incident light to one of the VIS camera 24 along optical path 60 or the NIR camera 26 along optical path 62. Prior to passing to the detectors 22, 24, 26, the electromagnetic radiation passes through a field lens, each indicated at 64, and a filter wheel, each indicated at 66. The switching mechanism 50 embodying the counter rotating beam splitter 56 can create aberrations in the transmitted light. A second tilted parallel plate may be provided and rotated about the optical path ninety degrees to the beam splitter to correct the aberrations. Counter rotation of the beam splitter and the tilted plate minimizes boresight offset correction of the transmitted path to the SWIR camera 22.

Figure 7:
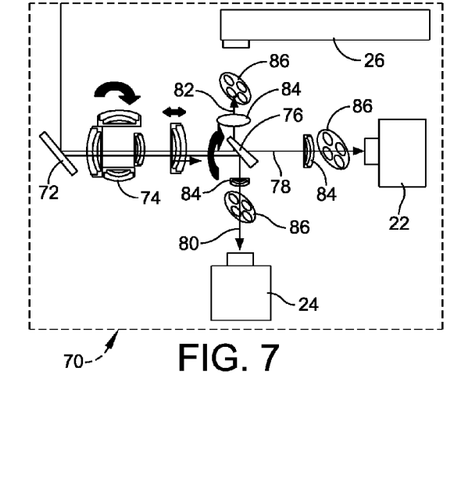
FIG. 7 is a schematic view of a rolling beam splitter optical switching mechanism of another embodiment of the present disclosure.
Figure 8:
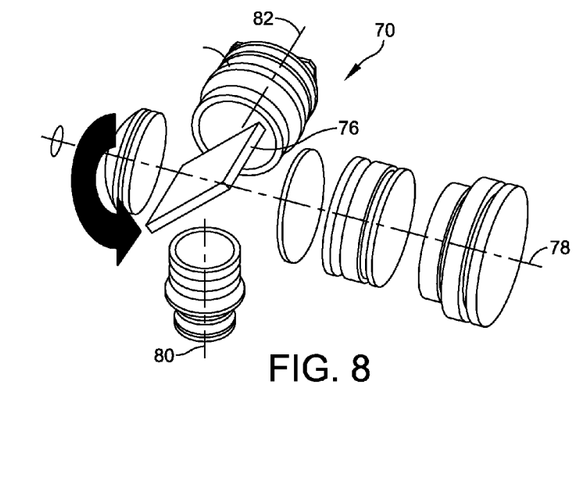
FIG. 8 is a schematic view of the rolling beam splitter optical switching mechanism of FIG. 7 showing electromagnetic radiation travelling through the switching mechanism.

Referring to FIGS. 7 and 8, another rolling beam splitter optical switching mechanism is generally indicated at 70. The rolling beam splitter optical switching mechanism 70 is similarly constructed as switching mechanisms 28, 50, and includes a mirror 72, which is positioned to receive electromagnetic radiation from the mirror 32 positioned adjacent the shared aperture telescope 20. The mirror 72 directs electromagnetic radiation to an effective focal length (EFL) switching optics 74, which in turn directs the electromagnetic radiation to a rotating wedge beam splitter 76, which is configured to direct a customizable percent of the incident light to the SWIR camera 22 along optical path 78 and the remaining fraction of the incident light to one of the VIS camera 24 along optical path 80 or the NIR camera 26 along optical path 82. Prior to passing to the detectors 22, 24, 26, the electromagnetic radiation passes through a field lens, each indicated at 84, and a filter wheel, each indicated at 86. The switching mechanism embodying the rotating wedge beam splitter 76 is minimizes aberrations caused by parallel plates.

Figure 9:
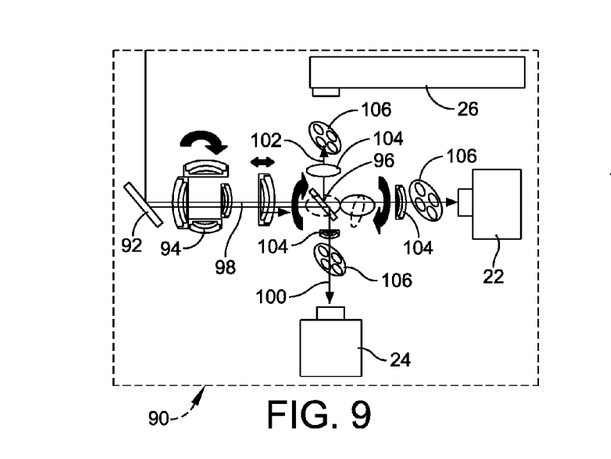
FIG. 9 is a schematic view of a rolling beam splitter optical switching mechanism of another embodiment of the present disclosure.
Figure 10:
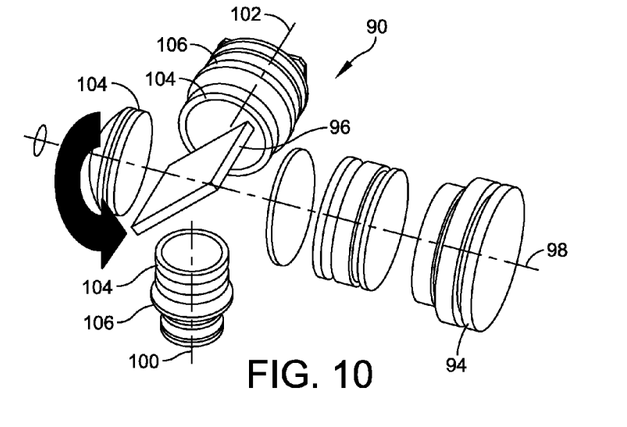
FIG. 10 is a schematic view of the rolling beam splitter optical switching mechanism of FIG. 9 showing electromagnetic radiation travelling through the switching mechanism.

Referring to FIGS. 9 and 10, another rolling beam splitter optical switching mechanism is generally indicated at 90. The rolling beam splitter optical switching mechanism is similarly constructed as switching mechanisms 28, 50, 70, and includes a mirror 92, which is positioned to receive electromagnetic radiation from the mirror 32 positioned adjacent the shared aperture telescope 20 The mirror 92 directs electromagnetic radiation to an effective focal length (EFL) switching optics 94, which in turn directs the electromagnetic radiation to a rotating beam splitter 96 with a tilted decentered lens option, which is configured to direct a customizable percent of the incident light to the SWIR camera 22 along an optical path 98 and the remaining fraction of the incident light to one of the VIS camera 24 along optical path 100 or the NIR camera 26 along the optical path. Prior to passing to the detectors 22, 24, 26, the electromagnetic radiation passes through a field lens, each indicated at 104, and a filter wheel, each indicated at 106. The switching mechanism 90 embodying the rotating beam splitter 96 with tilted decentered lens option is configured to correct or minimize the aberrations produced by a parallel plate beam splitter in the transmitted light path and to introduce a tilted and/or decentered lens element following the beam splitter.

Figure 11:
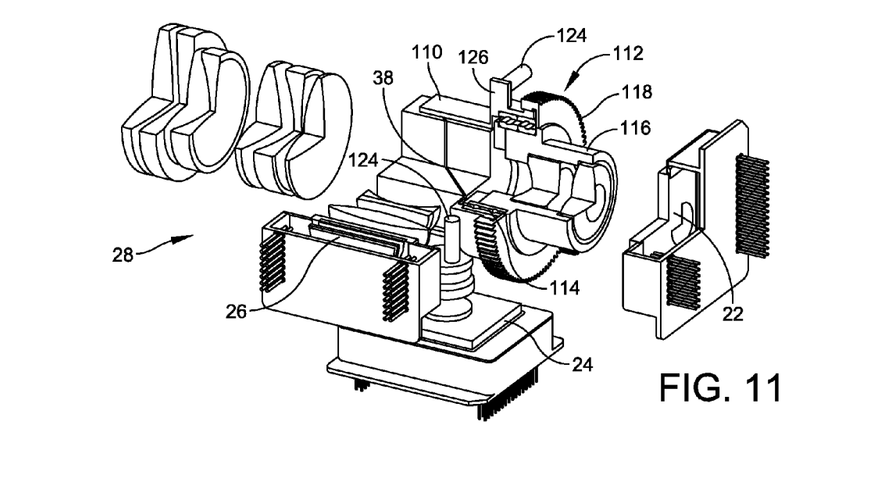
FIG. 11 is a perspective view of an exemplary rolling beam splitter optical switching mechanism of an embodiment of the present disclosure.
Figure 12:
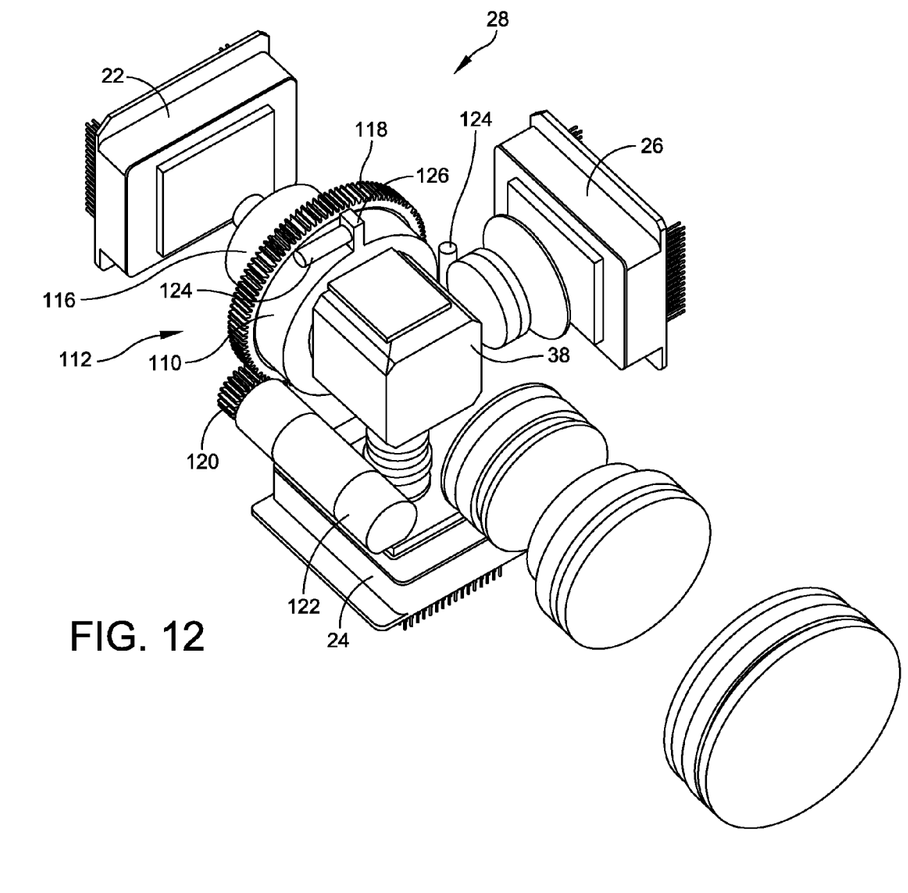
FIG. 12 is a perspective view of the rolling beam splitter optical switching mechanism of FIG. 11 showing electromagnetic radiation travelling through the switching mechanism.

FIGS. 11 and 12 illustrate the component parts of the switching mechanism 28 that rotate the beam splitter cube 38 a quarter turn (90 degrees). As described above, the switching mechanism 28 may be configured to rotate the beam splitter cube 38 more than a quarter turn, e.g., a half turn. Although switching mechanism 28 is shown and described in FIGS. 11 and 12, it should be understood that the principles described herein may be applied to switching mechanisms 50, 70, 90.

As shown, the switching mechanism 28 includes a cylindrical housing 110 that supports the immersed beam splitter cube 38. The housing 110 is coupled to drive assembly, generally indicated at 112, by a duplex pair angular contact bearing 114. The drive assembly 112 includes a hub portion 116 that contacts the contact bearing 114 and a spur gear 118 that engages and is driven by a mating spur gear 120, which is driven by a motor 122 (FIG. 12). In certain embodiments, the motor 122 is coupled to a controller, which controls the operation of the rolling beam splitter optical switching mechanism 28. The drive assembly 112 is configured to rotate the beam splitter cube 38 one quarter turn (90 degrees). To ensure that the beam splitter cube 38 does not over rotate, two adjustable hard stops, each indicated at 124, may be provided. As shown, the housing 110 includes a tab portion 126 that engages the hard stops 124 to prevent over rotation of the beam splitter cube 38 when directing the beam splitter to the desired detector 24, 26.

During operation, as mentioned above, the switching mechanism 28 is configured to always direct transmitted electromagnetic radiation to the SWIR camera 22. The rolling beam splitter optical switching mechanism 28 of embodiments of the present disclosure is adapted to also direct the reflected electromagnetic radiation to the VIS camera 24 positioned below the switching mechanism 28. When desired, the rolling beam splitter optical switching mechanism 28 is manipulated, e.g., by a controller, to rotate the beam splitter cube 38 by the drive assembly 112 to direct the reflected electromagnetic radiation to the NIR camera by powering the motor 122 of the drive assembly.

Figure 13:
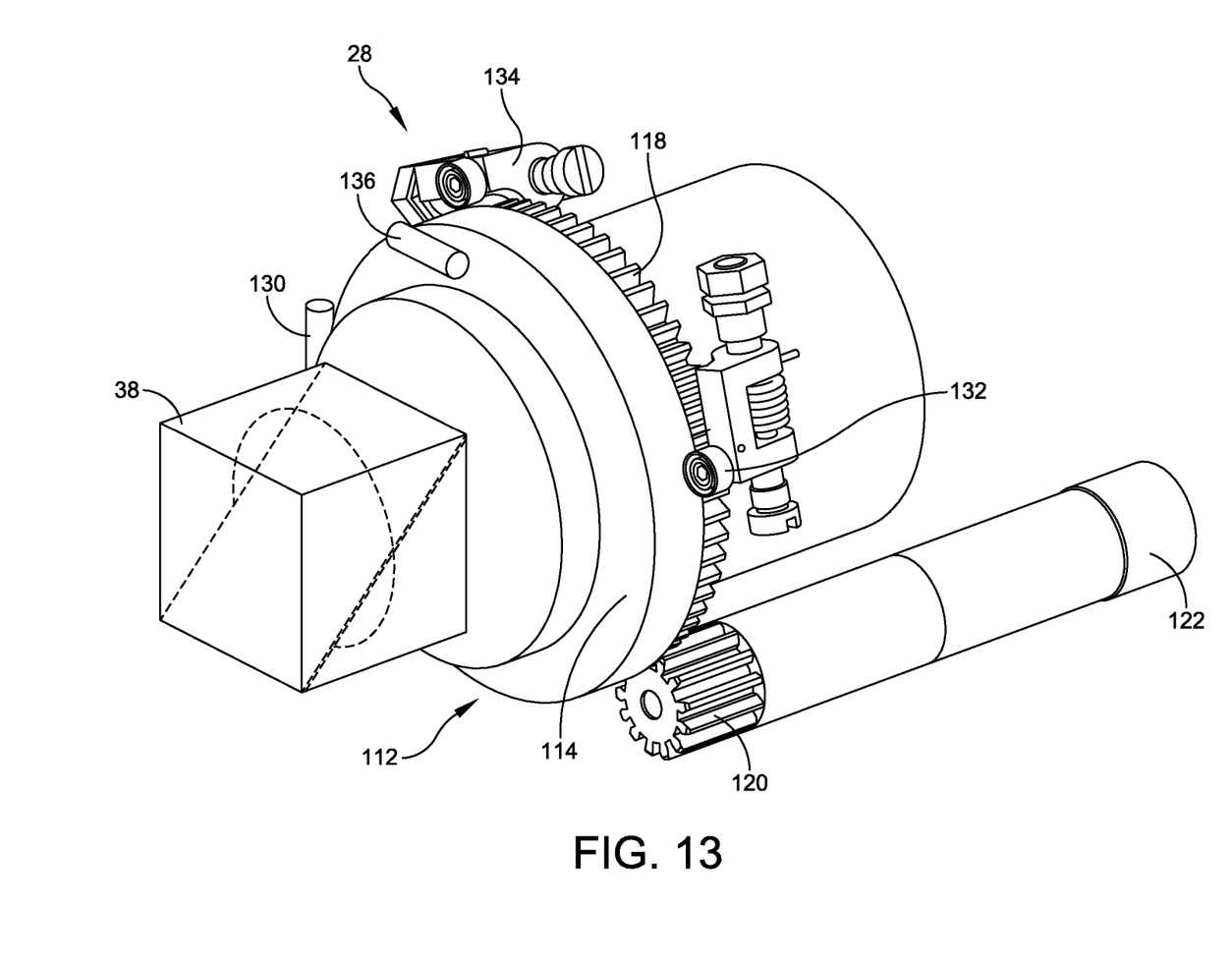
FIG. 13 is a perspective view of the rolling beam splitter optical switching mechanism of FIG. 11 illustrating a camera implementation.
Figure 14:
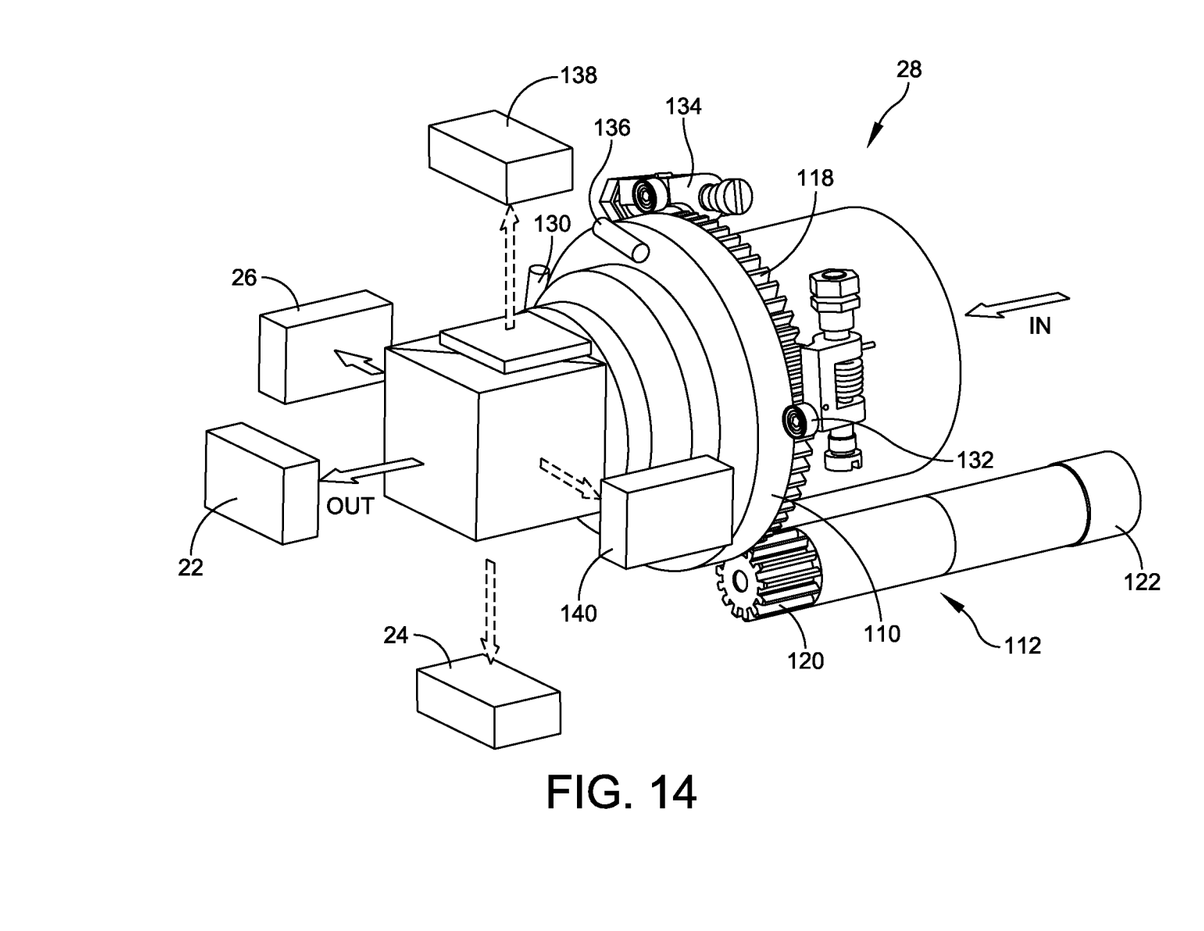
FIG. 14 is a perspective view of the rolling beam splitter optical switching mechanism of FIG. 13 showing electromagnetic radiation travelling through the switching mechanism.

Referring to FIGS. 13 and 14, in certain embodiments, the switching mechanism 28 may include four stops 130, 132, 134, 136 that are used to position the beam splitter cube 38. As shown, in addition to VIS camera 24 and NIR camera 26, a third camera 138 and a fourth camera 140 can be provided. With this embodiment, the switching mechanism 28 is adapted to rotate the beam splitter cube 38 beyond the quarter turn limits of switching mechanism. As shown, the drive assembly 112 is configured to rotate the beam splitter cube 38 to direct the reflected electromagnetic radiation to one of four cameras 24, 26, 138, 140. The four adjustable hard stops 130, 132, 134, 136 of the switching mechanism 28 limit the rotation of the beam splitter cube to a desired camera.

It should be observed that the rolling beam splitter optical switching mechanism of embodiments of the present disclosure enables one detector to be combined with another detector that may be switched with up to four other options for a total of four dual detector combinations. The switching mechanism enables shorter back focal length positioning of detectors. Further, the switching mechanism enables easier detector upgrades as the detectors are more physically separated allowing modular construction options.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A rolling beam splitter optical switching mechanism for combination and selection of detector illumination, the switching mechanism comprising:
   a housing;
   an immersed cube beam splitter supported by the housing, the beam splitter being configured to direct electromagnetic radiation in a first direction along a first optical path to a first camera and a second direction along a second optical path to a second camera; and
   a drive assembly configured to rotate the beam splitter to change a direction of electromagnetic radiation directed by the beam splitter from a first position in which the beam splitter directs electromagnetic radiation along the first optical path and the second optical path to a second position in which the beam splitter directs electromagnetic radiation along the first optical path and a third direction along a third optical path to a third camera.

2. The switching mechanism of claim 1, wherein the second optical path extends in a direction perpendicular to the first optical path.

3. The switching mechanism of claim 2, wherein the drive assembly includes a drive gear secured to the housing and a driven gear, coupled to a motor, configured to drive the drive gear.

4. The switching mechanism of claim 3, wherein the drive gear and the driven gear are spur gears.

5. The switching mechanism of claim 3, wherein the drive assembly further includes at least one adjustable hard stop to limit the rotation of the housing.

6. A rolling beam splitter optical switching mechanism for combination and selection of detector illumination, the switching mechanism comprising:
   a housing;
   an immersed cube beam splitter supported by the housing, the beam splitter being configured to direct electromagnetic radiation in a first direction along a first optical path to a first camera and a second direction along a second optical path to a second camera; and
   means for rotating the beam splitter to change a direction of electromagnetic radiation directed by the beam splitter from a first position in which the beam splitter directs electromagnetic radiation along the first optical path the second optical path and a second position in which the beam splitter directs electromagnetic radiation along the first optical path and a third direction along a third optical path to a third camera.

7. The switching mechanism of claim 6, wherein the second optical path extends in a direction perpendicular to the first optical path.

8. The switching mechanism of claim 7, wherein the means for rotating includes a drive assembly coupled to the beam splitter.

9. The switching mechanism of claim 8, wherein the drive assembly includes a drive gear secured to the housing and a driven gear, coupled to a motor, configured to drive the drive gear.

10. The switching mechanism of claim 9, wherein the drive gear and the driven gear are spur gears.

11. The switching mechanism of claim 9, wherein the drive assembly further includes at least one adjustable hard stop to limit the rotation of the housing.

12. A method of directing electromagnetic radiation from a beam splitter to a target, the method comprises:
    directing electromagnetic radiation to an immersed cube beam splitter supported by a housing, the beam splitter being configured to direct electromagnetic radiation in a first direction along a first optical path to a first camera and a second direction along a second optical path to a second camera; and
    rotating the beam splitter to change a direction of electromagnetic radiation directed by the beam splitter from a first position in which the beam splitter directs electromagnetic radiation along the first optical path and the second optical path to a second position in which the beam splitter directs electromagnetic radiation along the first optical path and a third direction along a third optical path to a third camera.

13. The method of claim 12, wherein the second optical path extends in a direction perpendicular to the first optical path.

14. The method of claim 13, wherein rotating the beam splitter includes a drive assembly coupled to the beam splitter.

15. The method of claim 14, wherein the drive includes a drive gear secured to the housing and a driven gear, coupled to a motor, configured to drive the drive gear.

16. The method of claim 15, wherein the drive gear and the driven gear are spur gears.

17. The method of claim 15, further comprising stopping the rotation of the beam splitter with at least one adjustable hard stop to limit the rotation of the beam splitter.

\* \* \* \* \*